US012577395B2

(12) United States Patent
Lin et al.

(10) Patent No.: US 12,577,395 B2
(45) Date of Patent: Mar. 17, 2026

(54) RESIN COMPOSITION AND ARTICLE MANUFACTURED USING THE SAME

(71) Applicant: Elite Material Co., Ltd., Taoyuan City (TW)

(72) Inventors: Yu-Te Lin, Taoyuan City (TW); Jun-Yan Yu, Taoyuan City (TW); Chien-Cheng Wang, Taoyuan City (TW)

(73) Assignee: Elite Material Co., Ltd., Taoyuan City (TW)

(*) Notice: Subject to any disclaimer, the term of this patent is extended or adjusted under 35 U.S.C. 154(b) by 517 days.

(21) Appl. No.: 18/210,869

(22) Filed: Jun. 16, 2023

(65) Prior Publication Data

US 2024/0352251 A1 Oct. 24, 2024

(30) Foreign Application Priority Data

Apr. 20, 2023 (TW) ................................ 112114703

(51) Int. Cl.

*C08L 71/12* (2006.01)
*C08K 5/00* (2006.01)
*C09D 171/12* (2006.01)
*C09J 171/12* (2006.01)

(52) U.S. Cl.

CPC ............ *C08L 71/12* (2013.01); *C08K 5/0066* (2013.01); *C08L 2201/02* (2013.01); *C08L 2203/16* (2013.01); *C08L 2203/20* (2013.01)

(58) Field of Classification Search

None

See application file for complete search history.

(56) References Cited

U.S. PATENT DOCUMENTS

| | | | | |
|---|---|---|---|---|
| 2002/0058601 A1* | 5/2002 | Jordan, IV | .............. | C04B 24/32 510/505 |
| 2017/0190837 A1* | 7/2017 | Hsieh | .................. | H05K 1/0326 |
| 2019/0030799 A1* | 1/2019 | Chen | ...................... | B33Y 70/10 |
| 2019/0153272 A1* | 5/2019 | Stevenson | .................. | C08J 3/07 |

FOREIGN PATENT DOCUMENTS

| | | |
|---|---|---|
| CN | 105542457 A | 5/2016 |
| CN | 106029720 A | 10/2016 |

* cited by examiner

*Primary Examiner* — Michael J Feely
(74) *Attorney, Agent, or Firm* — BACON & THOMAS, PLLC

(57) ABSTRACT

A resin composition is provided, which comprises: 75 parts by weight of vinyl group-containing polyphenylene ether resin; 35 parts by weight to 60 parts by weight of an insoluble flame retardant; and 0.4 parts by weight to 5 parts by weight of a compound represented by the following formula (1):

(1)

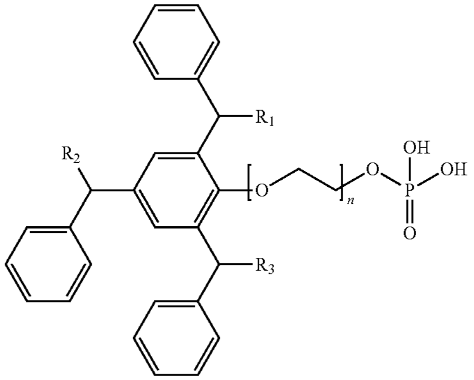

wherein $R_1$, $R_2$, $R_3$ and n are defined in the specification. The present invention also provides an article manufactured using the aforesaid resin composition.

11 Claims, 2 Drawing Sheets

RESIN COMPOSITION AND ARTICLE MANUFACTURED USING THE SAME

CROSS-REFERENCE TO RELATED APPLICATIONS

This application claims the benefits of the Taiwan Patent Application Serial Number 112114703, filed on Apr. 20, 2023, the subject matter of which is incorporated herein by reference.

BACKGROUND OF THE INVENTION

Field

The present invention relates to a resin composition. More specifically, the present invention relates to a resin composition which can be used for preparing a prepreg, a resin film, a laminate or a printed circuit board.

Description of Related Art

The raw materials for preparing laminates (also known as copper clad laminates, which can be referred to as laminates) usually comprise flame retardants to provide flame retardancy. Flame retardants can be generally divided into resin-type flame retardant, soluble flame retardant and insoluble flame retardant. The resin-type flame retardant can be the DOPO-containing bisphenol A phenolic resin (for example XZ92741), but it may deteriorate the dielectric constant and dissipation factor of the laminates due to the hydroxyl group of the DOPO-containing bisphenol A phenolic resin. The soluble flame retardant means that this kind of flame retardant can be dissolved in an organic solvent. Phosphazene (such as SPB-100) is usually used as a soluble flame retardant. The disadvantage of phosphazene is that increasing the used amount of phosphazene can effectively increase the flame retardancy but greatly deteriorate the glass transition temperature and dimensional stability of the laminates, and the insufficient used amount of phosphazene cannot achieve effective flame retardancy.

The use of insoluble flame retardant on the laminates can effectively achieve flame retardancy, and it is known that the use of insoluble flame retardant does not simultaneously deteriorate the dielectric constant and dissipation factor of the laminates, and also does not deteriorate the glass transition temperature and dimensional stability of the laminates. However, when the insoluble flame retardant is used on the laminates, cracks may occur on the insulating layer of the cured resin during the subsequent printed circuit board manufacturing process. This crack may cause the failure of the reliability test of the circuit board, and then cause the circuit board to become a defective product and have to be discarded.

Therefore, it is desirable to provide a novel resin composition containing insoluble flame retardant to solve the problem of cracks in the insulating layer when the insoluble flame retardant is used.

SUMMARY OF THE INVENTION

In view of the problems encountered in the prior art, the main object of the present invention is to provide a resin composition, and products manufactured using the same.

To achieve the aforesaid object, the present invention provides a resin composition, which comprises: 75 parts by weight of vinyl group-containing polyphenylene ether resin; 35 parts by weight to 60 parts by weight of an insoluble flame retardant; and 0.4 parts by weight to 5 parts by weight of a compound represented by the following formula (1):

(1)

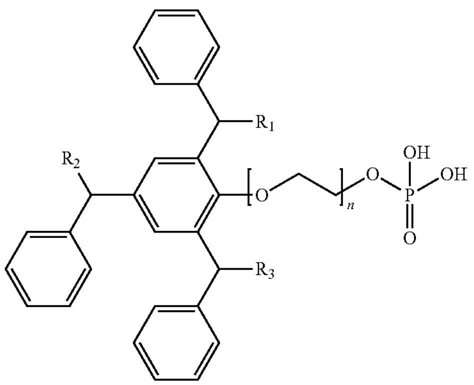

wherein each $R_1$, $R_2$ and $R_3$ is independently $C_{1-6}$ alkyl, and n is a positive integer from 4 to 25.

It is currently known that a resin composition comprising an insoluble flame retardant can be used to make a laminate. However, in the subsequent process for manufacturing the printed circuit board, the insulating layer formed by curing the resin composition may have cracks, which will lead to the failure of the reliability test of the circuit board and reduce the yield of the circuit board. In the resin composition of the present invention, by adding an appropriate amount of a compound having the structure represented by the formula (1), not only the flame retardant properties of the manufactured laminates can be maintained, but also the problem of cracks in the insulating layers of the laminates manufactured by the conventional resin composition comprising the insoluble flame retardant can be solved, thereby improving the yield of the circuit boards.

Except for the aforesaid resin composition, the present invention further provides an article (or product) manufactured using the aforesaid resin composition, wherein the article may include, for example, a prepreg, a resin film, a laminate or a printed circuit board.

For example, in one embodiment, the article provided by the present invention has one or more or all of the following characteristics:

- the adhesion strength between the glass fiber fabric and the insulating layer resin of the copper-containing laminate measured by referring to the method described in IPC-TM-650 2.4.8 is greater than 3.5 lbs/inch;
- the burning time of each sample of the copper-free laminate measured by referring to the UL94 vertical burning test specification is less than or equal to 10 seconds (a total of five samples are tested); and
- the circuit board tested by the conductive anodic filament (CAF) test referring to the method described in IPC-TM-650 2.6.25 can pass the test time of more than 1,000 hours.

Other objects, advantages and novel features of the present invention will become more apparent from the following detailed description.

DETAILED DESCRIPTION OF THE INVENTION

Figure 1:
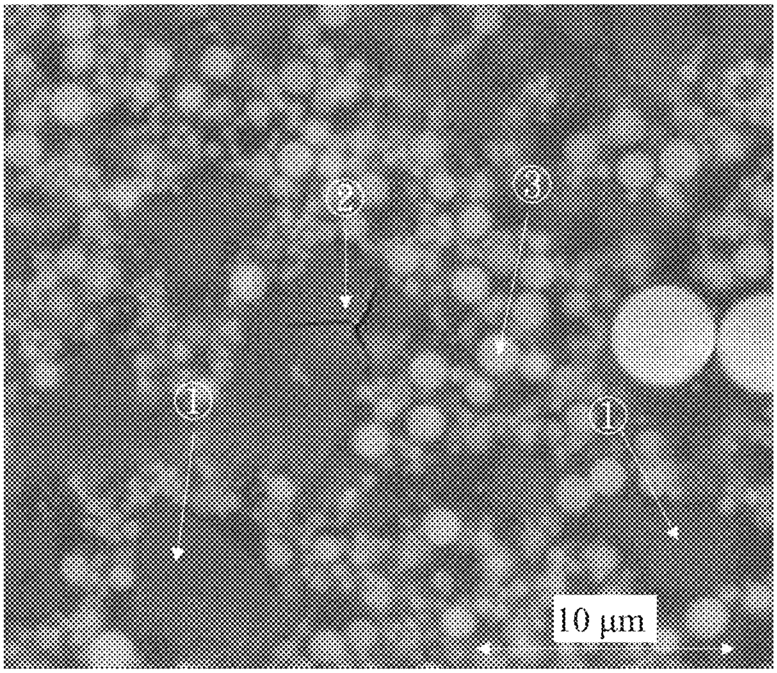
FIG. 1 is a SEM image showing a bonding gap test that failed.

In the present specification, the term “a” or “an” can be interpreted as including at least one, that is, including “one” or “plural”.

In the present specification, the terms “comprise”, “include”, “have”, “contain” or any other similar terms are open-ended transitional phrases. The terms “consisting of” and “consist” are closed-transitional phrases.

In the present specification, the range “10.0 to 20.0”, “between 10.0 and 20.0” or “from 10.0 to 20.0” should be deemed to have been specifically disclosed all subranges such as 10.0 to 20.0, 10.0 to 11.0, 15.0 to 20.0, 11.0 to 19.0, etc.

In the present specification, the numerical values in the present invention include all numerical ranges that are the same as the numerical values after rounding to the number of significant digits of the numerical values.

Unless otherwise specified, in the present invention, “polymer” refers to a compound formed by monomers through polymerization reactions, and also includes polymer aggregates, and each polymer can be formed by multiple structural units connected by covalent bonds. In the present specification, “polymer” includes homopolymers, copolymers, prepolymers and the like. “Prepolymer” refers to a product formed by polymerization of multiple compounds, wherein the conversion rate may be greater than 10% (for example, 10% to 90%). “Polymer” may also include oligomers, which may be composed of multiple (for example, 2 to 20, usually 2 to 5) repeating units. For example, when referring to “diene polymer”, it may include diene homopolymers, diene copolymers, diene prepolymers, or diene oligomers.

In the present invention, the copolymer refers to the product formed by polymerization reaction of two or more kinds of monomers, and includes but not limited to random copolymers, alternating copolymers, graft copolymers or block copolymers. For example, a styrene-butadiene copolymer is a product obtained by polymerization of only two kinds of monomers of styrene and butadiene. For example, styrene-butadiene copolymers include, but are not limited to styrene-butadiene random copolymers, styrene-butadiene alternating copolymers, styrene-butadiene graft copolymers or styrene-butadiene block copolymers. Styrene-butadiene block copolymers include, but are not limited to, the polymerized molecular structure of styrene-styrene-styrene-butadiene-butadiene-butadiene-butadiene. Styrene-butadiene block copolymers include, for example but are not limited to, styrene-butadiene-styrene block copolymers. Styrene-butadiene-styrene block copolymers include, for example but are not limited to, the polymerized molecular structure of styrene-styrene-styrene-butadiene-butadiene-butadiene-butadiene-styrene-styrene-styrene. Similarly, hydrogenated styrene-butadiene copolymers include hydrogenated styrene-butadiene random copolymers, hydrogenated styrene-butadiene alternating copolymers, hydrogenated styrene-butadiene graft copolymers or hydrogenated styrene-butadiene block copolymer. Hydrogenated styrene-butadiene block copolymers include, for example but are not limited to, hydrogenated styrene-butadiene-styrene block copolymers.

In the present invention, the term “resin” can include monomers, polymers formed by monomers, combinations of monomers, combinations of polymers formed by monomers, or combinations of monomers and polymers formed by monomers. For example, in the present invention, “maleimide resin” includes maleimide monomers, maleimide polymers, combinations of maleimide monomers, combinations of maleimide polymers or combinations of maleimide monomers and maleimide polymers.

For example, in the present invention, “vinyl group-containing” includes vinyl group, vinylene group, allyl group, (meth)acrylate group, methacryloyl group or a combination thereof when interpreted. Herein, vinyl group includes vinylbenzyl group.

Unless otherwise specified, in the present invention, a modification includes: products obtained by modifying reactive functional groups of resins, homopolymers obtained by polymerization of resins, prepolymers obtained by polymerization of resins with other resins, copolymers obtained by polymerization of resins with other resins, or cross-linked polymers obtained by cross-linking resins with other resins, but the present invention is not limited thereto. For example, the modification may be to replace the original hydroxyl group with a vinyl group through a chemical reaction, or to obtain a terminal hydroxyl group through a chemical reaction between the original terminal vinyl group and p-aminophenol.

In the present invention, the unsaturated bond described in the present invention refers to the reactive unsaturated bond, such as but not limited to the unsaturated double bond that can cross-link with other functional groups, such as but not limited to the unsaturated carbon-carbon double bond that can cross-link with other functional groups.

In the present invention, when the specific examples of acrylate compounds are written in the form of “(methyl)”, it should be interpreted that it includes both the aspect of containing a methyl group and the aspect of not containing a methyl group. For example, the “(meth)acrylate-containing polyphenylene ether resin” should be interpreted as including two aspects of methacrylate-containing polyphenylene ether resin and acrylate-containing polyphenylene ether resin.

In the present invention, the alkyl group described in the present invention includes its various isomers when interpreted, and for example, propyl group should be interpreted as including n-propyl group and isopropyl group.

In the present specification, part(s) by weight represents weight part(s), which can be any weight unit, such as but not limited to kilogram(s), gram(s), pound(s) and other weight units. For example, 100 parts by weight of maleimide resin means that it can be 100 kg of maleimide resin or 100 lbs of maleimide resin. If the resin solution includes solvent and resin, the parts by weight of the general (solid or liquid) resin refers to the weight unit of the (solid or liquid) resin, and does not include the weight unit of the solvent in the solution. The parts by weight of the solvent refer to the weight unit of the solvent.

The present invention provides a resin composition, which comprises: 75 parts by weight of vinyl group-containing polyphenylene ether resin; 35 parts by weight to 60 parts by weight of an insoluble flame retardant; and 0.4 parts by weight to 5 parts by weight of a compound represented by the above formula (1). Hereinafter, the resin composition provided by the present invention will be further described.

Vinyl Group-Containing Polyphenylene Ether Resin

For example, in one embodiment, the resin composition comprises vinyl group-containing polyphenylene ether resin.

For example, in one embodiment, unless otherwise specified, the vinyl group-containing polyphenylene ether resin mentioned in the various embodiments of the present invention may include polyphenylene ether resins with terminals modified by vinyl or allyl groups, such as vinylbenzyl group-containing polyphenylene ether resin. Alternatively, the vinyl group-containing polyphenylene ether resin may be (meth)acrylate-containing polyphenylene ether resin. For example, the vinyl group-containing polyphenylene ether resin includes, but is not limited to, vinylbenzyl group-containing biphenyl polyphenylene ether resin, methacrylate-containing polyphenylene ether resin, vinylbenzyl group-containing bisphenol A polyphenylene ether resin or a combination thereof. For example, the vinyl group-containing polyphenylene ether resin includes various polyphenylene ether resins disclosed in U.S. Patent Application Publication No. 2016/0185904 A1, and the entire contents of which are hereby incorporated by reference.

For example, in one embodiment, the vinyl group-containing polyphenylene ether resin may include various vinyl group-containing polyphenylene ether resins known in the art. The vinyl group-containing polyphenylene ether resin suitable for the present invention is not particularly limited, and may be any one or more commercially available products, self-made products or a combination thereof. In some embodiments, any one or more of the following vinyl group-containing polyphenylene ether resins may be used: vinylbenzyl group-containing biphenyl polyphenylene ether resin (for example, OPE-2st, available from Mitsubishi Gas Chemical Co.), methacrylate-containing polyphenylene ether resin (for example, SA9000, available from Sabic), vinylbenzyl group-containing bisphenol A polyphenylene ether resin or a combination thereof. However, the present invention is not limited thereto.

For example, in one embodiment, the content of the vinyl group-containing polyphenylene ether resin in the resin composition is 75 parts by weight. The contents of other components are the relative contents related to 75 parts by weight of the vinyl group-containing polyphenylene ether resin.

For example, in one embodiment, the vinyl group-containing polyphenylene ether resin in the resin composition may comprise methacrylate-containing polyphenylene ether resin, vinylbenzyl group-containing biphenyl polyphenylene ether resin or a combination thereof.

For example, in one embodiment, the vinyl group-containing polyphenylene ether resin in the resin composition may comprise methacrylate-containing polyphenylene ether resin and vinylbenzyl group-containing biphenyl polyphenylene ether resin. Herein, the weight ratio of the methacrylate-containing polyphenylene ether resin and the vinylbenzyl group-containing biphenyl polyphenylene ether resin may range from 9:1 to 1:9, preferably from 9:1 to 1:1, more preferably from 6:1 to 1:1, and most preferably from 4:1 to 2.75:1. However, the present invention is not limited thereto.

For example, in one embodiment, the vinyl group-containing polyphenylene ether resin in the resin composition may comprise 75 parts by weight of methacrylate-containing polyphenylene ether resin. For example, in one embodiment, the vinyl group-containing polyphenylene ether resin in the resin composition may comprise 75 parts by weight of the vinylbenzyl group-containing biphenyl polyphenylene ether resin. For example, in one embodiment, the vinyl group-containing polyphenylene ether resin in the resin composition may comprise 1 part by weight to 74 parts by weight of the methacrylate-containing polyphenylene ether resin and 1 part by weight to 74 parts by weight of the vinylbenzyl group-containing biphenyl polyphenylene ether resin, and the total amount of the methacrylate-containing polyphenylene ether resin and the vinylbenzyl group-containing biphenyl polyphenylene ether resin is 75 parts by weight. For example, in one embodiment, the vinyl group-containing polyphenylene ether resin in the resin composition may comprise 55 parts by weight to 60 parts by weight of the methacrylate-containing polyphenylene ether resin and 15 parts by weight to 20 parts by weight of the vinylbenzyl group-containing biphenyl polyphenylene ether resin, and the total amount of the methacrylate-containing polyphenylene ether resin and the vinylbenzyl group-containing biphenyl polyphenylene ether resin is 75 parts by weight. However, the present invention is not limited thereto.

Insoluble Flame Retardant

For example, in one embodiment, the resin composition comprises insoluble flame retardant.

For example, in one embodiment, the insoluble flame retardant comprises: insoluble phosphorus-containing flame retardant, insoluble brominated flame retardant or a combination thereof. In the present invention, the term "insoluble" is also called as "insoluble type". The insoluble flame retardant means that the flame retardant cannot be dissolved in solvents, especially in organic solvents. For example, the insoluble flame retardant cannot be dissolved in the organic solvent such as toluene, xylene, acetone, butanone, cyclohexanone, N-methylpyrrolidone, but the present invention is not limited thereto. In one embodiment, the insoluble flame retardant is insoluble in organic solvents at 25° C. and 100° C.

For example, in one embodiment, the insoluble flame retardant may comprise: insoluble flame retardant containing 9,10-dihydro-9-oxa-10-phosphaphenanthrene-10-oxide (DOPO), insoluble flame retardant containing diphenylphosphine oxide (DPPO) or a combination thereof. Herein, the insoluble DOPO-containing flame retardant may comprise di-DOPO flame retardant, and examples of the di-DOPO flame retardant may include but is not limited to the compound represented by the following formula (2). In addition, the insoluble DPPO-containing flame retardant may comprise di-DPPO flame retardant, and examples of the di-DPPO flame retardant may include but is not limited to the compound represented by the following formula (3).

(2)

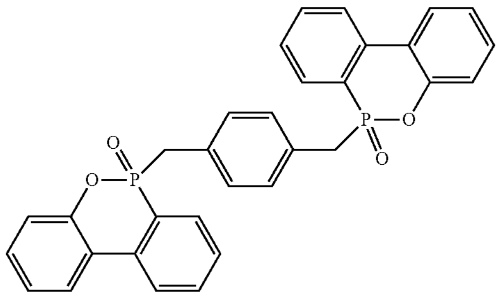

-continued (3)

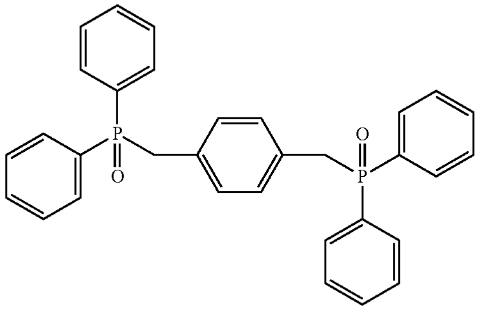

For example, in one embodiment, the insoluble flame retardant may comprise: di-DOPO flame retardant, di-DPPO flame retardant or a combination thereof. In one embodiment, the insoluble flame retardant may comprise: the compound represented by the above formula (2), the compound represented by the above formula (3) or a combination thereof.

For example, in one embodiment, the insoluble flame retardant may comprise: decabrominated flame retardant, octabrominated flame retardant or a combination thereof. Examples of the decabrominated flame retardant may include, but is not limited to, the compound represented by the following formula (4). In addition, examples of the octabrominated flame retardant may include, but is not limited to, the compound represented by the following formula (5).

(4)

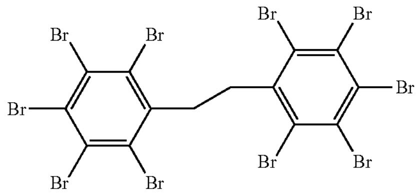

(5)

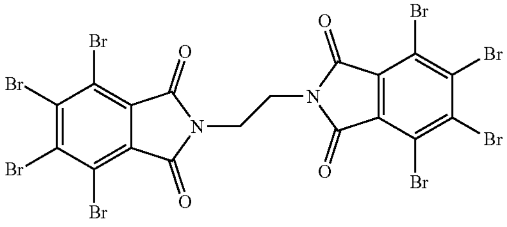

For example, in one embodiment, the insoluble flame retardant may comprise: the compound represented by the above formula (4), the compound represented by the above formula (5) or a combination thereof.

In addition, in the present invention, when two or more insoluble flame retardants are used in combination, the mixing ratio between the insoluble flame retardants is not particularly limited and can be adjusted according to the needs.

Compound Represented by the Formula (1)

For example, in one embodiment, the resin composition may comprise the compound represented by the formula (1), wherein each $R_1$, $R_2$ and $R_3$ is independently $C_{1-6}$ alkyl, and n is a positive integer from 4 to 25.

For example, in one embodiment, $R_1$, $R_2$ and $R_3$ may be the same or different. In one embodiment, $R_1$, $R_2$ and $R_3$ may be the same.

For example, in one embodiment, each $R_1$, $R_2$ and $R_3$ may independently be $C_{1-6}$ alkyl, preferably $C_{1-3}$ alkyl, more preferably $C_{1-2}$ alkyl, and most preferably methyl. In the present invention, the term "alkyl" refers to a straight or branched hydrocarbon group comprising 1-6 carbon atoms (for example, $C_{1-6}$, $C_{1-3}$ or $C_{1-2}$), and examples thereof include methyl, ethyl, n-propyl, isopropyl, n-butyl, isobutyl and tert-butyl.

For example, in one embodiment, the compound represented by the formula (1) may be the compound represented by the following formula (1-1).

(1-1)

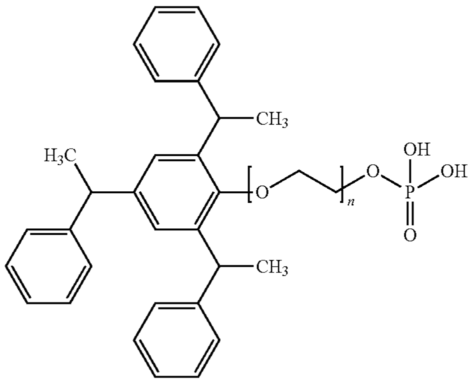

Other Resin

For example, in one embodiment, the resin composition may selectively further comprise maleimide resin, and the content of the maleimide resin is not particularly limited. For example, in one embodiment, with respect to 75 parts by weight of the vinyl group-containing polyphenylene ether resin, the resin composition may selectively further comprise 0 parts by weight to 40 parts by weight of maleimide resin. In one embodiment, the resin composition may not comprise maleimide resin, and at this time, the content of maleimide resin is 0 parts by weight; here, it means that maleimide resin is not intentionally added into the resin composition. In one embodiment, with respect to 75 parts by weight of the vinyl group-containing polyphenylene ether resin, the resin composition may selectively further comprise 1 part by weight to 40 parts by weight of maleimide resin, but the present invention is not limited thereto.

For example, in one embodiment, examples of maleimide resin include, but are not limited to, 4,4'-diphenylmethane bismaleimide, polyphenylmethane maleimide (or called as oligomer of phenylmethane maleimide), bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, vinyl benzyl maleimide (VBM), maleimide with biphenyl structure, maleimide resin containing aliphatic long chain structure, prepolymer of diallyl compound and maleimide resin, prepolymer of multifunctional amine and maleimide resin (herein, the multifunctional amine includes two or more amine groups), prepolymer of acidic phenolic compound and maleimide resin or a combination thereof. Modifications of these components are also included in the interpretation.

For example, examples of maleimide resin include, but are not limited to, maleimide resin produced by Daiwakasei Industry Co., Ltd. with trade names BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 or BMI-7000H, maleimide resin produced by K.I Chemical Co., Ltd. with trade names BMI-70 or BMI-80, or maleimide resin produced by Nippon Kayaku Co., Ltd. with trade names MIR-3000 or MIR-5000.

For example, examples of maleimide resin containing aliphatic long chain structure include, but are not limited to, maleimide resin produced by Designer Molecular Co., Ltd. with trade names BMI-689, BMI-1400, BMI-1500, BMI-1700, BMI-2500, BMI-3000, BMI-5000 or BMI-6000.

The aforementioned maleimide resins can be used alone or in combination of two or more.

For example, in one embodiment, when the resin composition comprises maleimide resin, with respect to 75 parts by weight of the vinyl group-containing polyphenylene ether resin, the content of the maleimide resin may range from 1 part by weight to 40 parts by weight, preferably from 5 parts by weight to 40 parts by weight, more preferably from 10 parts by weight to 40 parts by weight, and most preferably from 10 parts by weight to 35 parts by weight. However, the present invention is not limited thereto, and the content of the maleimide resin may be adjusted according to the needs.

For example, in one embodiment, the resin composition may selectively further comprise vinyl group-containing polyolefin, and the content of vinyl group-containing polyolefin is not limited. In one embodiment, with respect to 75 parts by weight of the vinyl group-containing polyphenylene ether resin, the resin composition may selectively further comprise 1 part by weight to 40 parts by weight of the vinyl group-containing polyolefin, but the present invention is not limited thereto. In one embodiment, the resin composition may not comprise vinyl group-containing polyolefin, and at this time, the content of vinyl group-containing polyolefin is 0 parts by weight; here, it means that vinyl group-containing polyolefin is not intentionally added into the resin composition.

For example, in one embodiment, the type of the vinyl group-containing polyolefin is not limited, and may include various vinyl group-containing olefin polymers known in the art. Examples of the vinyl group-containing polyolefin include, but are not limited to polybutadiene, polyisoprene, styrene-butadiene copolymer, styrene-isoprene copolymer, styrene-butadiene-divinylbenzene terpolymer, styrene-butadiene-maleic anhydride terpolymer, vinyl group-polybutadiene-urea ester oligomer, maleic anhydride-butadiene copolymer, or a combination thereof.

For example, in one embodiment, when the resin composition comprises the vinyl group-containing polyolefin, with respect to 75 parts by weight of the vinyl group-containing polyphenylene ether resin, the content of the vinyl group-containing polyolefin may range from 1 part by weight to 40 parts by weight, preferably from 1 part by weight to 30 parts by weight, more preferably from 1 part by weight to 20 parts by weight, and most preferably from 5 parts by weight to 12 parts by weight. However, the present invention is not limited thereto, and the content of the vinyl group-containing polyolefin may be adjusted according to the needs.

For example, in one embodiment, the resin composition may selectively further comprise hydrogenated polyolefin, and the content of the hydrogenated polyolefin is not limited. In one embodiment, with respect to 75 parts by weight of the vinyl group-containing polyphenylene ether resin, the resin composition may selectively further comprise 1 part by weight to 40 parts by weight of the hydrogenated polyolefin, but the present invention is not limited thereto. In one embodiment, the resin composition may not comprise hydrogenated polyolefin, and at this time, the content of the hydrogenated polyolefin is 0 parts by weight; here, it means that the hydrogenated polyolefin is not intentionally added into the resin composition.

For example, in one embodiment, the type of the hydrogenated polyolefin is not limited, and may include various hydrogenated styrene-butadiene-styrene block copolymers (also called as styrene-ethylene/butylene-styrene copolymers). The hydrogenated polyolefin suitable for the present invention is not particularly limited, and may be any one or more commercially available products, self-made products or a combination thereof. For example, in one embodiment, the hydrogenated polyolefin may include hydrogenated styrene-butadiene-styrene block copolymer, hydrogenated styrene-butadiene-styrene block copolymers substituted with maleic anhydride or a combination thereof. That is, the hydrogenated polyolefin may include, but is not limited to, unsubstituted hydrogenated styrene-butadiene-styrene triblock copolymers, hydrogenated styrene-butadiene-styrene triblock copolymers substituted with maleic anhydride or a combination thereof. For example, in one embodiment, the hydrogenated polyolefin may be hydrogenated polyolefin produced by Asahi KASEI Corporation with the trade names H1221, H1062, H1521, H1052, H1041, H1053, H1051, H1517, H1043, N504, H1272, M1943, M1911 or M1913, or hydrogenated polyolefin produced by KRATON company with trade names G1650, G1651, G1652, G1654, G1657, G1726, FG1901 or FG1924, or hydrogenated polyolefins produced by Kuraray Company with trade names 8004, 8006 or 8007L.

For example, in one embodiment, when the resin composition comprises the hydrogenated polyolefin (for example, hydrogenated styrene-butadiene-styrene block copolymer), with respect to 75 parts by weight of the vinyl group-containing polyphenylene ether resin, the content of the hydrogenated polyolefin may range from 1 part by weight to 40 parts by weight, preferably from 1 part by weight to 30 parts by weight, more preferably from 1 part by weight to 20 parts by weight, and most preferably from 4 parts by weight to 10 parts by weight. However, the present invention is not limited thereto, and the content of the hydrogenated polyolefin (for example, hydrogenated styrene-butadiene-styrene block copolymer) may be adjusted according to the needs.

Other Additives

For example, in one embodiment, the resin composition may selectively further comprise an inorganic filler, and the content of the inorganic filler is not limited. In one embodiment, with respect to 75 parts by weight of the vinyl group-containing polyphenylene ether resin, the resin composition may selectively further comprise 30 parts by weight to 130 parts by weight of the inorganic filler, but the present invention is not limited thereto.

For example, in one embodiment, the inorganic filler in the resin composition may be silica. For example, in one embodiment, the inorganic filler in the resin composition may be spherical silica.

For example, in one embodiment, with respect to 75 parts by weight of the vinyl group-containing polyphenylene ether resin, the content of spherical silica may range from 30 parts by weight to 130 parts by weight, for example but not limited to, 30 parts by weight, 35 parts by weight, 40 parts by weight, 50 parts by weight, 60 parts by weight, 70 parts by weight, 80 parts by weight, 100 parts by weight or 120 parts by weight. For example, the content of the spherical silica may range from 60 parts by weight to 120 parts by weight, but is not limited thereto. However, the present invention is not limited thereto, and the content of the inorganic filler may be adjusted according to the needs.

For example, in one embodiment, the spherical silica may comprise various types of spherical silica known in the art, and the particle size distribution D50 of the spherical silica may be, for example, less than or equal to 2.0 μm. For example, the particle size distribution D50 of the spherical silica may preferably range from 0.2 μm to 2.0 μm, for example, but not limited to, 0.2 μm, 0.3 μm, 0.4 μm, 0.6 μm, 0.8 μm, 1.2 μm, 1.3 μm or 2.0 μm. In the present invention, the particle size distribution D50 refers to the particle size corresponding to the cumulative volume distribution of fillers (such as but not limited to spherical silica) reaching 50% as measured by laser scattering. The spherical silica suitable for the present invention is not particularly limited, and may be any one or more commercially available products, such as but not limited to spherical silica purchased from Admatechs Company, or spherical silica purchased from Denka Company.

For example, in one embodiment, the spherical silica may optionally be pretreated with silane coupling agents, such as but not limited to amino silane coupling agents, epoxy silane coupling agents, vinyl silane coupling agent or acrylate silane coupling agent. With respect to 100 parts by weight of the spherical silica, the amount of the aforesaid silane coupling agents for pretreatment may range from 0.005 parts by weight to 0.5 parts by weight, but the present invention is not limited thereto.

For example, in one embodiment, the resin composition may selectively further comprise a curing initiator (also called as a reaction initiator), and the content of the curing initiator is not limited. In one embodiment, with respect to 75 parts by weight of the vinyl group-containing polyphenylene ether resin, the resin composition may selectively further comprise 0.01 parts by weight to 10 parts by weight of the curing initiator, but the present invention is not limited thereto.

For example, in one embodiment, with respect to 75 parts by weight of the vinyl group-containing polyphenylene ether resin, the content of the curing initiator in the resin composition may range from 0.01 parts by weight to 10 parts by weight, preferably from 0.01 parts by weight to 5 parts by weight, more preferably from 0.01 parts by weight to 1 part by weight, and most preferably from 0.05 parts by weight to 0.2 parts by weight. However, the present invention is not limited thereto, and the content of the curing initiator can be adjusted according to the needs.

In the present invention, the curing initiator in the resin composition may be any one or more curing initiators suitable for making prepregs, laminates or printed circuit boards. The curing initiator may be peroxides, azo initiators, carbon-carbon initiators or a combination thereof. For example, in one embodiment, the curing initiator in the resin composition may be peroxide. Examples of the peroxide may include, but are not limited to, dibenzoyl peroxide (BPO), dicumyl peroxide (DCP), 2,5-dimethyl-2,5-di(tert-butylperoxy)hexane, 2,5-dimethyl-2,5-bis(tert-butylperoxy)-3-hexyne (25B), di-tert-butyl peroxide, bis(tert-butylperoxyisopropyl)benzene, bis(tert-butyl peroxy)phthalate, bis (tert-butyl peroxy)isophthalate, tert-butyl peroxybenzoate, 2,2-bis(tert-butyl peroxy)butane, 2,2-bis(tert-butylperoxy) octane, 2,5-dimethyl-2,5-bis(benzoylperoxy)hexane, lauryl peroxide, tert-hexyl pivalate peroxide, dibutyl cumene peroxide, bis(4-tert-butylcyclohexyl)peroxydicarbonate or a combination thereof.

For example, in one embodiment, the resin composition may selectively further include triallyl isocyanurate. In one embodiment, the resin composition may not contain triallyl isocyanurate, and at this time, the content of triallyl isocyanurate is 0 parts by weight; here, it means that triallyl isocyanurate is not intentionally added into the resin composition.

For example, in one embodiment, when the resin composition comprises triallyl isocyanurate, with respect to 75 parts by weight of the vinyl group-containing polyphenylene ether resin, the content of the triallyl isocyanurate may range from 5 parts by weight to 40 parts by weight, preferably from 5 parts by weight to 30 parts by weight, more preferably from 5 parts by weight to 20 parts by weight, and most preferably from 5 parts by weight to 10 parts by weight. However, the present invention is not limited thereto, and the content of the triallyl isocyanurate may be adjusted according to the needs.

For example, in one embodiment, the resin composition may selectively further comprise an inhibitor, and the content of the inhibitor is not limited. In one embodiment, with respect to 75 parts by weight of the vinyl group-containing polyphenylene ether resin, the resin composition may selectively further comprise 0.1 parts by weight to 0.5 parts by weight of the inhibitor, but the present invention is not limited thereto. In one embodiment, the resin composition may not comprise an inhibitor, and at this time, the content of the inhibitor is 0 parts by weight; here, it means that the inhibitor is not intentionally added into the resin composition.

For example, in one embodiment, when the resin composition comprises the inhibitor, with respect to 75 parts by weight of the vinyl group-containing polyphenylene ether resin, the content of the inhibitor may range from 0.1 parts by weight to 0.5 parts by weight, for example, may be 0.1 parts by weight, 0.2 parts by weight, 0.3 parts by weight, 0.45 parts by weight or 0.5 parts by weight. However, the present invention is not limited thereto, and the content of the inhibitor may be adjusted according to the needs.

In the present invention, the inhibitor in the resin composition may be any one or more inhibitors suitable for making prepregs, laminates or printed circuit boards. The inhibitor includes various molecular polymerization inhibitors, stable free radical polymerization inhibitors or a combination thereof known in the art. For example, the molecular polymerization inhibitors include, but are not limited to, phenolic compounds, quinone compounds, aromatic amine compounds, aromatic hydrocarbon nitro compounds, sulfur-containing compounds, variable-valent metal chlorides, or a combination thereof. More specifically, the molecular polymerization inhibitors include, but are not limited to, phenol, hydroquinone, 4-tert-butylcatechol, benzoquinone, chloranil, 1,4-naphthoquinone, trimethylquinone, aniline, nitrobenzene, $Na_2S$, $FeCl_3$, $CuCl_2$ or a combination thereof. For example, the stable free radical polymerization inhibitors include, but are not limited to, 1,1-diphenyl-2-trinitrophenylhydrazine (DPPH), triphenylmethyl, 2,2,6,6-tetramethyl piperidine-1-oxide, derivatives of 2,2,6,6-tetramethylpiperidine-1-oxide, or a combination thereof.

For example, in one embodiment, the resin composition may selectively further comprise another flame retardant different from the aforesaid insoluble flame retardant. In one embodiment, the resin composition may not contain another flame retardant different from the aforesaid insoluble flame retardant, and at this time, the content of another flame retardant different from the aforesaid insoluble flame retardant is 0 parts by weight; here, it means that another flame retardant different from the aforesaid insoluble flame retardant is not intentionally added into the resin composition.

For example, in one embodiment, when the resin composition comprises another flame retardant different from the aforesaid insoluble flame retardant, the content of another flame retardant different from the aforesaid insoluble flame retardant may range from 1 parts by weight to 20 parts by weight, and for example, may be 1 part by weight, 3 parts by weight, 5 parts by weight, 10 parts by weight, 15 parts by weight or 20 parts by weight. However, the present invention is not limited thereto, and the content of another flame retardant different from the aforesaid insoluble flame retardant may be adjusted according to the needs.

For example, in one embodiment, examples of another flame retardant different from the aforesaid insoluble flame retardant may include, but are not limited to ammonium polyphosphate, hydroquinone bis-(diphenyl phosphate), bisphenol A bis-(diphenylphosphate), tri(2-carboxyethyl) phosphine (TCEP), tris(chloroisopropyl)phosphate, trimethyl phosphate (TMP), dimethyl methyl phosphonate (DMMP), resorcinol bis(dixylenyl phosphate), RDXP (such as commercially available products PX-200, PX-201 or PX-202), phosphazene (such as commercially available products SPB-100, SPH-100 or SPV-100), melamine polyphosphate, 9,10-dihydro-9-oxa-10-phosphaphenanthrene-10-oxide (DOPO) or derivatives thereof or resin thereof, diphenylphosphine oxide (DPPO) or derivatives thereof or resin thereof, melamine cyanurate, tri-hydroxyethyl isocyanurate, aluminum phosphinate (such as commercially available products OP-930 or OP-935) or a combination thereof. The aforesaid 9,10-dihydro-9-oxa-10-phosphaphenanthrene-10-oxide (DOPO) or derivatives thereof or resin thereof do not comprise the insoluble DOPO-containing flame retardant, and the aforesaid diphenylphosphine oxide (DPPO) or derivatives thereof or resin thereof do not comprise the insoluble DPPO-containing flame retardant. In the present invention, the amount of another flame retardant different from the aforesaid insoluble flame retardant is not particularly limited.

For example, in one embodiment, another flame retardant different from the aforesaid insoluble flame retardant may be DPPO compounds, DOPO compounds, DOPO resin (such as DOPO-HQ, DOPO-NQ, DOPO-PN or DOPO-BPN) or DOPO-bonding epoxy resin, wherein DOPO-PN is DOPO phenol novolak resin, and DOPO-BPN may be DOPO bisphenol novolac resin such as DOPO-BPAN (DOPO-bisphenol A novolac), DOPO-BPFN (DOPO-bisphenol F novolac) or DOPO-BPSN (DOPO-bisphenol S novolac). Herein, another flame retardant does not comprise the insoluble DOPO-containing flame retardant and the insoluble DPPO-containing flame retardant. Unless otherwise specified, the amount of another flame retardant different from the aforesaid insoluble flame retardant is not particularly limited.

For example, in one embodiment, the resin composition may selectively further include polysiloxane. In one embodiment, the resin composition may not contain polysiloxane, and at this time, the content of polysiloxane is 0 parts by weight; here, it means that polysiloxane is not intentionally added into the resin composition. For example, in one embodiment, when the resin composition comprises polysiloxane, the content of the polysiloxane may range from 5 parts by weight to 30 parts by weight, for example, 5 parts by weight, 10 parts by weight or 15 parts by weight. However, the present invention is not limited thereto, and the content of polysiloxane may be adjusted according to the needs.

For example, in one embodiment, the polysiloxane in the resin composition may include, but are not limited to the polysiloxane available from Shin-Etsu Company with trade names X-22-161A, X-22-161B, X-22-163A, X-22-163B or X-22-164.

For example, in one embodiment, the resin composition may selectively further comprise at least one compound selected from the group consisting of: divinylbenzene, bis(vinylbenzyl)ether, bis(vinylphenyl)ethane, bis(vinylphenyl)dimethylene benzene, bis(vinylphenyl)dimethylene ether, bis(vinylphenyl)diethylenebenzene, divinylnaphthalene, divinylbiphenyl, self-polymers of divinylbenzene, copolymers of divinylbenzene and other vinyl group-containing compounds, styrene, polystyrene, triallyl cyanurate, 1,2,4-trivinylcyclohexane, polyfunctional acrylates, dicyclopentadiene, norbornene, and acenaphthylene. The aforementioned compounds may be used alone or in combination. Furthermore, for example, in one embodiment, the contents of the aforementioned compounds may respectively range from 1 part by weight to 50 parts by weight, preferably from 1 part by weight to 40 parts by weight, more preferably from 1 part by weight to 30 parts by weight and most preferably from 1 part by weight to 10 parts by weight. However, the present invention is not limited thereto, and the content of the aforementioned compounds may be adjusted according to the needs.

For example, in one embodiment, the resin composition may selectively further comprise at least one component selected from the group consisting of: inorganic fillers other than spherical silica, solvents, silane coupling agents, colorants, toughening agents and core-shell rubbers. The aforementioned components may be used alone or in combination.

For example, in one embodiment, with respect to 75 parts by weight of the vinyl group-containing polyphenylene ether resin, the content of the inorganic fillers other than spherical silica may range from 5 parts by weight to 130 parts by weight and preferably from 10 parts by weight to 80 parts by weight. However, the present invention is not limited thereto, and the content of the inorganic fillers other than spherical silica may be adjusted according to the needs.

For example, in one embodiment, the contents of silane coupling agents, colorants, toughening agents and core-shell rubbers may respectively range from 0.01 parts by weight to 10 parts by weight, for example but not limited to, from 0.01 parts by weight to 3 parts by weight, from 3 parts by weight to 8 parts by weight or from 5 parts by weight to 10 parts by weight. However, the present invention is not limited thereto, and the contents of the aforementioned components may be adjusted according to the needs.

For example, in one embodiment, the aforementioned inorganic fillers other than spherical silica may be any one or more of the inorganic fillers other than spherical silica suitable for making prepregs, laminates or printed circuit boards. Examples thereof include, but are not limited to, non-spherical silicon dioxide (that is, the known irregular type, and the irregular type is not spherical), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate modified talc, zinc oxide, zirconia, mica, boehmite (AlOOH), calcined talc, talc, silicon nitride or calcined kaolin. In addition, except for the aforementioned non-spherical silica, the aforementioned inorganic fillers may be spherical, fibrous, plate-like, granular, flake-like, needle-like or whisker-like. The inorganic fillers other than spherical silica may selectively be pretreated with a silane coupling agent. The examples and amount of the silane coupling agent used to pretreat the inorganic fillers are as mentioned above, and are not repeated here.

The main function of adding solvent is to dissolve the components in the resin composition, change the solid content of the resin composition, and adjust the viscosity of the resin composition. Examples of the solvent include, but are not limited to, methanol, ethanol, ethylene glycol monomethyl ether, acetone, butanone (also known as methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, dimethylformamide, dimethylacetamide, nitromethylpyrrolidone or a combination thereof. The using amount of the aforesaid solvent is not particularly limited, and may be adjusted according to the desired viscosity of the resin composition. If the solvent is added into the resin composition, the solvent will be volatilized and removed when the resin composition is heated at high temperature to form a semi-cured state, so there is no solvent present in the prepreg or resin film, or there is only a trace amount of solvent present in the prepreg or resin film.

In the present invention, the silane coupling agent used as the additive for the resin composition may include silane (such as but not limited to siloxane), which can be divided into amino silane, epoxide silane, vinyl silane, ester silane, hydroxy silane, isocyanate silane, methacryloxysilane and acryloxysilane according to the types of the functional groups. The amount of the aforementioned silane coupling agent is not particularly limited, and can be adjusted depending on the dispersibility of the inorganic fillers in the resin composition.

In the present invention, the colorants suitable for the present invention may include but not limited to dyes or pigments.

In the present invention, the toughening agent is added to improve the toughness of the resin composition. In the present invention, the toughening agent suitable for the present invention may include but not limited to carboxyl-terminated butadiene acrylonitrile rubber (CTBN).

In the present invention, the core-shell rubber applicable to the present invention may include commercially available core-shell rubbers.

Article Manufactured Using the Resin Composition

The aforesaid resin composition provided by the present invention may be made into various articles through various processing methods, including but not limited to prepregs, laminates or printed circuit boards.

For example, the resin composition provided by the present invention can be used to make a prepreg, which includes a reinforcing material and a layered structure disposed thereon. The layered structure is formed by heating the aforementioned resin composition to a semi-cured state (B-stage). The temperature for making the prepreg may be between 120° C. and 150° C., and preferably between 120° C. and 140° C. The reinforcing material may be any one of fiber material, woven fabric, and non-woven fabric, and the woven fabric preferably includes glass fiber fabric. The type of the glass fiber fabric is not particularly limited, and can be various commercially available glass fiber fabrics that can be used for printed circuit boards, such as E-type glass fiber fabric (i.e., E-glass fiber fabric), D-type glass fiber fabric, S-type glass fiber fabric, T-type glass fiber fabric, L-shaped glass fiber fabric or Quartz fiber fabric, wherein the types of fibers include yarn and roving, and the form may include spread form or standard form. The aforementioned non-woven fabric preferably includes liquid crystal resin non-woven fabric, such as polyester non-woven fabric, polyurethane non-woven fabric, etc., and is not limited thereto. The aforementioned woven fabric may also include liquid crystal resin woven fabric, such as polyester woven fabric or polyurethane woven fabric, and is not limited thereto. The reinforcing material can increase the mechanical strength of the prepreg. In one preferred embodiment, the reinforcing material may also be selectively pretreated with a silane coupling agent. After the prepreg is subsequently heated for curing (C-stage), an insulating layer can be formed.

For example, the aforementioned resin composition can be made into a resin film, which is obtained by heating and baking to semi-cure the aforementioned resin composition. The resin composition may be selectively applied on a polyethylene terephthalate film (PET film), a polyimide film (PI film), a copper foil or a resin-coated copper foil, followed by heating and baking to semi-cure the resin composition to form a resin film.

For example, the aforementioned resin composition can be made into a laminate.

For example, in one embodiment, the aforementioned laminate may include at least two metal foils and at least one insulating layer, the insulating layer is disposed between the two metal foils, and the insulating layer may be formed by laminating and curing the aforementioned resin composition at high temperature and under high pressure (C-stage). The suitable curing temperature is, for example, between 200° C. and 235° C., and preferably between 210° C. and 230° C.; the curing time may be 60 to 300 minutes, and preferably 90 to 300 minutes; and the suitable pressure may be 350 to 600 psi, and preferably 350 to 450 psi. The aforementioned insulating layer may be obtained by curing the aforementioned prepreg. The aforementioned metal foil can be made of copper, aluminum, nickel, platinum, silver, gold or alloys thereof. For example, the metal foil may be a copper foil. In a preferred embodiment, the laminate is a copper-clad laminate.

For example, in one embodiment, the aforementioned laminate can be further processed into a printed circuit board after circuit processing, and the manufacturing method of the printed circuit board can be any known manufacturing method.

For example, the article manufactured by the resin composition provided by the present invention has at least one of the following characteristics:

- the adhesion strength between the glass fiber fabric and the insulating layer resin of the copper-containing laminate measured by referring to the method described in IPC-TM-650 2.4.8 is greater than 3.5 lbs/inch;
- the burning time of each sample of the copper-free laminate measured by referring to the UL94 vertical burning test specification is less than or equal to 10 seconds (a total of five samples are tested); and
- the circuit board tested by the CAF test referring to the method described in IPC-TM-650 2.6.25 can pass the test time of more than 1,000 hours.

The chemical materials used in the following embodiments and comparative embodiments of the present invention are as follows.

SA9000: methacrylate-containing polyphenylene ether resin, available from Sabic.

OPE-2st 2200 and OPE-2st 1200: vinylbenzyl group-containing biphenyl polyphenylene ether resin, available from Mitsubishi Gas.

BMI-70: bis(3-ethyl-5-methyl-4-maleimidobenzene) methane, available from K.I Chemical Co., Ltd.

BMI-80: 2,2'-bis-[4-(4-maleimidephenoxy)phenyl]propane), available from K.I Chemical Co., Ltd.

BMI-2300: polyphenylmethanemaleimide, available from Daiwa Fine Chemicals Co., Ltd.

BMI-3000: maleimide resin of the following formula (A), available from Designer Molecules.

(6)

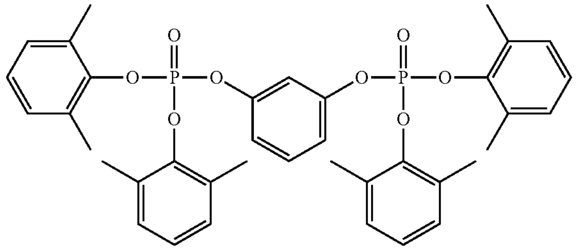

(A)

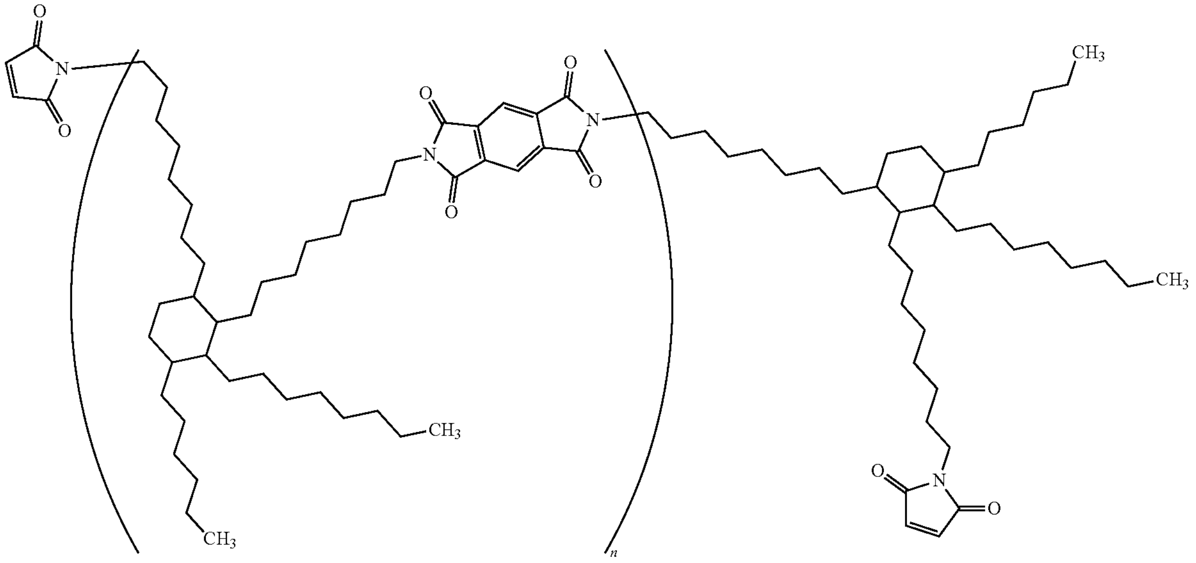

Herein, n is a positive integer of 1 to 10.

B1000 and B3000: polybutadiene, available from Nippon Soda Co., Ltd.

Ricon 150: polybutadiene, available from Cray Valley.

Ricon 257: styrene-butadiene-divinylbenzene terpolymer, available from Cray Valley.

Ricon 184MA6: styrene-butadiene-maleic anhydride terpolymer, available from Cray Valley.

H1052: hydrogenated styrene-butadiene-styrene block copolymer, available from Asahi KASEI.

G1726: hydrogenated styrene-butadiene-styrene block copolymer, available from Kraton Corporation.

Di(vinylphenyl)ethane: 1,2-di(vinylphenyl)ethane, available from Linchuan Chemical Co., Ltd.

Divinylbenzene terpolymer: divinylbenzene-styrene-ethylstyrene terpolymer, as Preparation example 1.

TAIC: triallyl isocyanurate, available from Kingyorker Enterprise Co. Ltd.

Compound of formula (1-1): liquid compound, wherein n in the structure of formula (1-1) is a positive integer from 4 to 25, trade name LFH, available from Clariant.

PX-200: condensed phosphate, a compound having the structure of formula (6), available from Daihachi Chemical Industry Co., Ltd.

PX-202: condensed phosphate, a compound having the structure of formula (7), available from Daihachi Chemical Industry Co., Ltd.

(7)

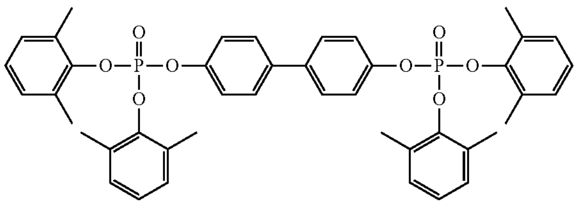

A-187: epoxide siloxane, available from Dow Corning.

KBM-573: amino siloxane, available from Shin Etsu.

KBM-1003: vinyl siloxane, available from Shin Etsu.

KBM-403: epoxide siloxane, available from Shin Etsu.

KBM-503: methacrylate-containing siloxane, available from Shin Etsu.

X-22-161A: aminopolysiloxane, available from Shin Etsu.

Di-DOPO: Compound of formula (2), prepared by the synthetic method of Compound A in Example 1 of TWI589628.

Di-DPPO: Compound of formula (3), prepared by the synthetic method of Compound A in Example 1 of TWI589686.

8010: Compound of formula (4), available from Albemarle.

BT-93 W: Compound of formula (5), available from Albemarle.

SC2050 SVJ: spherical silica, available from Admatechs.

SC2050 SXJ: spherical silica, available from Admatechs.

25B: 2,5-dimethyl-2,5-bis(tert-butylperoxy)-3-hexyne, available from NOF Corporation.

DCP: dicumyl peroxide, available from NOF Corporation.

Mixed solvent: a mixed solvent of toluene and butanone, wherein the parts by weight of toluene and butanone are listed in the following Table 1 to Table 3.

Preparation Example 1

100 parts by weight of toluene, 60 parts by weight of 1,4-divinylbenzene (available from Merck), 30 parts by weight of styrene and 40 parts by weight of 4-ethylstyrene (available from Alfa Chemistry) were added into a three-neck bottle. After stirring until fully dissolved, 2 parts by weight of tetrabutylammonium salt and 1 part by weight of tin chloride were added, followed by stirring at 100° C. for 3 hours. After the reaction was completed, through the steps of filtration, purification, methanol precipitation and cooling, divinylbenzene-styrene-ethylstyrene terpolymer was obtained, and the number-average molecular weight (Mn) thereof is 2000-3000 g/mol.

According to the following Table 1 to Table 3, the aforesaid chemical materials were formulated to prepare the resin compositions of Embodiments and Comparative embodiments of the present invention, and the resin compositions were further used to prepare various test samples.

TABLE 1

Components of the resin compositions of Embodiments 1 to 5 (Unit: parts by weight)

| Component | Type | Material | E1 | E2 | E3 | E4 | E5 |
|---|---|---|---|---|---|---|---|
| Polyphenylene ether | Vinyl group-containing polyphenylene ether resin | SA9000 | 60 | 60 | 60 | 60 | 60 |
| | | OPE-2st 2200 | 15 | 15 | 15 | 15 | 15 |
| | | OPE-2st 1200 | — | — | — | — | — |
| Maleimide | Maleimide | BMI-70 | 25 | 25 | 25 | 10 | 35 |
| Phosphate | Formula (1) | Formula (1-1) | 2.5 | 0.4 | 1 | 1 | 1 |
| | Condensed phosphate | PX-200 | — | — | — | — | — |
| | Condensed phosphate | PX-202 | — | — | — | — | — |
| Silicon compound | Siloxane compound | A-187 | — | — | — | — | — |
| | | KBM-573 | — | — | — | — | — |
| | | KBM-1003 | — | — | — | — | — |
| | | KBM-403 | — | — | — | — | — |
| | | KBM-503 | — | — | — | — | — |
| | | X-22-161A | — | — | — | — | — |
| Flame retardant | Di-DOPO | Di-DOPO | — | — | — | — | — |
| | Di-DPPO | Di-DPPO | 45 | 45 | 45 | 60 | 35 |
| | Decabrominated flame retardant | 8010 | — | — | — | — | — |
| | Octabrominated flame retardant | BT-93 | — | — | — | — | — |
| Reaction initiator | Peroxide | 25B | 0.15 | 0.15 | 0.15 | 0.15 | 0.15 |
| | | DCP | — | — | — | — | — |
| Inorganic filler | Spherical silica | SC-2050 SVJ | 80 | 80 | 80 | 80 | 80 |
| Solvent | Mixed solvent | Toluene/Butanone | 80/30 | 80/30 | 80/30 | 80/30 | 120/30 |

TABLE 2

Components of the resin compositions of Comparative embodiments 1 to 8 (Unit: parts by weight)

| Component | Type | Material | C1 | C2 | C3 | C4 | C5 | C6 | C7 | C8 |
|---|---|---|---|---|---|---|---|---|---|---|
| Polyphenylene ether | Vinyl group-containing polyphenylene ether resin | SA9000 | 60 | 60 | 60 | 60 | 60 | 60 | 60 | 45 |
| | | OPE-2st 2200 | 15 | 15 | 15 | 15 | 15 | — | 15 | 30 |
| | | OPE-2st 1200 | — | — | — | — | — | 15 | — | — |
| Maleimide | Maleimide | BMI-70 | 25 | 25 | 25 | 25 | 25 | 25 | 25 | 25 |
| Phosphate | Formula (1) | Formula (1-1) | — | — | — | — | — | — | — | — |
| | Condensed phosphate | PX-200 | 2.5 | 10 | — | — | 15 | 15 | — | 10 |
| | Condensed phosphate | PX-202 | — | — | — | — | — | — | 15 | — |
| Silicon compound | Siloxane compound | A-187 | — | — | — | 2.5 | — | — | — | 0.2 |
| | | KBM-573 | — | — | — | — | — | — | 2.5 | 0.2 |
| | | KBM-1003 | — | — | — | — | — | 2.5 | — | 0.2 |
| | | KBM-403 | — | — | — | — | 2.5 | — | — | 0.2 |

TABLE 2-continued

| Components of the resin compositions of Comparative embodiments 1 to 8 (Unit: parts by weight) | | | | | | | | | | |
|---|---|---|---|---|---|---|---|---|---|---|
| Component | Type | Material | C1 | C2 | C3 | C4 | C5 | C6 | C7 | C8 |
| | | KBM-503 | — | — | — | — | — | — | — | 0.2 |
| | | X-22-161A | — | — | — | — | — | — | — | 0.2 |
| Flame retardant | Di-DOPO | Di-DOPO | — | — | — | — | — | — | — | — |
| | Di-DPPO | Di-DPPO | 45 | 45 | 45 | 45 | 45 | 45 | 45 | 45 |
| | Decabrominated flame retardant | 8010 | — | — | — | — | — | — | — | — |
| | Octabrominated flame retardant | BT-93 | — | — | — | — | — | — | — | — |
| Reaction initiator | Peroxide | 25B | 0.15 | 0.15 | 0.15 | 0.15 | 0.15 | 0.2 | 0.15 | 0.15 |
| | | DCP | — | — | — | — | — | — | — | — |
| Inorganic filler | Spherical silica | SC-2050 SVJ | 80 | 80 | 80 | 80 | 80 | 80 | 80 | 80 |
| Solvent | Mixed solvent | Toluene/Butanone | 80/30 | 80/30 | 80/30 | 80/30 | 80/30 | 80/30 | 80/30 | 80/30 |

TABLE 3

| Components of the resin compositions of Embodiments 6 to 9 (Unit: parts by weight) | | | | | | |
|---|---|---|---|---|---|---|
| Component | Type | Material | E6 | E7 | E8 | E9 |
| Polyphenylene ether | Vinyl group-containing polyphenylene ether resin | SA9000 | 55 | 60 | 55 | 60 |
| | | OPE-2st 2200 | 10 | 15 | 10 | 15 |
| | | OPE-2st 1200 | 10 | — | 10 | — |
| Maleimide | Maleimide | BMI-70 | 25 | 25 | 25 | 10 |
| | | BMI-80 | — | — | — | 5 |
| | | BMI-2300 | — | — | — | 5 |
| | | BMI-3000 | — | — | — | 5 |
| Polyolefin | Vinyl-group containing polyolefin | B1000 | 3 | — | 3 | 3 |
| | | B3000 | 3 | — | 3 | — |
| | | Ricon 150 | — | — | — | 3 |
| | | Ricon 257 | 3 | — | 3 | — |
| | | Ricon 184MA6 | 3 | 5 | 3 | 6 |
| | Hydrogenated polyolefin | H1052 | — | 5 | — | 4 |
| | | G1726 | 4 | 5 | 4 | — |
| | Di(vinylphenyl)ethane | Di(vinylphenyl)ethane | 1 | — | 1 | — |
| | Divinylbenzene terpolymer | Divinylbenzene terpolymer | 5 | — | 5 | — |
| | Isocyanurate | TAIC | — | — | — | 8 |
| Phosphate | Formula (1) | Formula (1-1) | 0.6 | 5 | 1 | 1 |
| Silicon compound | Siloxane compound | A-187 | — | — | — | — |
| | | KBM-573 | — | — | — | — |
| | | KBM-1003 | — | — | — | 0.5 |
| | | KBM-403 | — | — | — | — |
| | | KBM-503 | — | — | — | — |
| | | X-22-161A | — | — | — | — |
| Flame retardant | Di-DOPO | Di-DOPO | — | 25 | — | 20 |
| | Di-DPPO | Di-DPPO | — | 20 | — | 25 |
| | Decabrominated flame retardant | 8010 | 15 | — | 20 | — |
| | Octabrominated flame retardant | BT-93W | 25 | — | 15 | — |
| Reaction initiator | Peroxide | 25B | 0.05 | 0.1 | 0.05 | 0.1 |
| | | DCP | — | 0.05 | — | 0.1 |
| Inorganic filler | Spherical silica | SC-2050 SVJ | 80 | 80 | 80 | 50 |
| | | SC-2050 SXJ | — | — | — | 10 |
| | | SC-2050 SEJ | — | — | — | — |
| Solvent | Mixed solvent | Toluene/Butanone | 100/40 | 80/30 | 100/40 | 100/20 |

Varnish

According to the amounts shown Table 1 to Table 3, the components of each Embodiments (abbreviated as E, such as E1 to E9) and Comparative embodiments (abbreviated as C, such as C1 to C3) were respectively added into the stirring tank and stirred. After mixing uniformly, the obtained resin composition was called as a varnish.

The formulation method of the resin composition of Embodiment 1 (E1) is used as an example. 60 parts by weight of SA9000, 15 parts by weight of OPE-2st 2200 and 25 parts by weight of BMI-70 were added into a reaction bottle with 110 parts by weight of the mixed solvent (80 parts by weight of toluene and 30 parts by weight of butanone), followed by stirring to completely dissolve and well mix SA9000, OPE-2st 2200 and BMI-70. Then, 2.5 parts by weight of the compound of formula (1) was added. After stirring and mixing well, 45 parts by weight of di-DPPO and 80 parts by weight of SC-2050 SVJ were added, followed by stirring and mixing well. Then, 0.15 parts by weight of 25B was added, followed by stirring for 1 hour to obtain the varnish of the resin composition of Embodiment 1 (E1).

In addition, according to the amounts shown in Table 1 to Table 3, the varnishes of the resin compositions of Embodiments 2 to 9 (E2 to E9) and Comparative embodiments 1 to 8 (C1 to C8) were prepared with reference to the preparation method of the varnish of Embodiment 1 (E1).

With reference to the following methods, the varnishes of Embodiments 1 to 9 (E1 to E9) and Comparative embodiments 1 to 8 (C1 to C8) were used to prepare the specimens to be tested. Then, the characteristic analyses were performed according to the following specific conditions.

Prepreg 1 (Using 2116 E-Glass Fiber Fabric)

The resin compositions in different Embodiments (E1 to E9) and Comparative embodiments (C1 to C8) listed in Table 1 to Table 3 were respectively put into an impregnation tank in batches. The glass fiber fabric (such as 2116 E-glass fiber fabric) was passed through the above impregnation tank, and the resin compositions were adhered to the glass fiber fabric. After heating at 130° C. for 3 minutes, the resin compositions were turned into the semi-cured state (B-Stage) to obtain the prepreg 1 (the resin content is about 53%).

Prepreg 2 (Using 1017 E-Glass Fiber Fabric)

The resin compositions in different Embodiments (E1 to E9) and Comparative embodiments (C1 to C8) listed in Table 1 to Table 3 were respectively put into an impregnation tank in batches. The glass fiber fabric (such as 1017 E-glass fiber fabric) was passed through the above impregnation tank, and the resin compositions were adhered to the glass fiber fabric. After heating at 130° C. for 3 minutes, the resin compositions were turned into the semi-cured state (B-Stage) to obtain the prepreg 2 (the resin content is about 79%).

Copper-Containing Laminate 1 (or Called as Copper-Clad Laminate 1, which is Prepared by Laminating Eight Prepregs 1)

Two reverse treatment foils (RTF) with the thickness of 18 μm and eight prepregs 1 (each Embodiments or each Comparative embodiments) were provided. One reverse treatment foil, eight prepregs 1 and one reverse treatment foil were laminated in sequence, and the lamination was performed under a vacuum condition at 400 psi and 215° C. for 4 hours to obtain a copper-containing laminate 1. Herein, the eight prepregs were cured to form the insulating layer between the two reverse treatment foils, and the resin content of the insulating layer was about 53%.

Copper-Containing Laminate 2 (which is Prepared by Laminating One Prepreg 1)

Two reverse treatment foils 3 (RTF3) with the thickness of 18 μm and one prepreg 1 (each Embodiments or each Comparative embodiments) were provided. One reverse treatment foil 3, one prepreg 1 and one reverse treatment foil 3 were laminated in sequence, and the lamination was performed under a vacuum condition at 400 psi and 215° C. for 4 hours to obtain a copper-containing laminate 2. Herein, the prepreg was cured to form the insulating layer between the two reverse treatment foils 3, and the resin content of the insulating layer was about 53%.

Copper-Containing Laminate 3 (which is Prepared by Laminating Eight Prepregs 2)

Two reverse treatment foils 3 (RTF3) with the thickness of 35 μm and eight prepregs 2 (each Embodiments or each Comparative embodiments) were provided, wherein the resin content of each prepreg 2 was about 79%. One reverse treatment foil 3, two prepregs 2, one copper-containing laminate 2, two prepregs 2, one copper-containing laminate 2, two prepregs 2, one copper-containing laminate 2, two prepregs 2 and one reverse treatment foil 3 were laminated in sequence, and the lamination was performed under a vacuum condition at 400 psi and 215° C. for 4 hours to obtain a copper-containing laminate 3.

Copper-Containing Laminate 4 (which is Prepared by Laminating One Prepreg 2)

Two reverse treatment foils 3 (RTF3) with the thickness of 18 μm and one prepreg 2, which was prepared by 1017 E-glass fiber fabric impregnated with each sample (each Embodiments or each Comparative embodiments) to be tested, were provided, and the resin content of each prepreg 2 was about 79%. One reverse treatment foil 3, one prepreg 2, and one reverse treatment foil 3 were laminated in sequence, and the lamination was performed under a vacuum condition at 400 psi and 215° C. for 4 hours to obtain a copper-containing laminate 4. Herein, the prepreg 2 was cured to form the insulating layer between the two reverse treatment foils 3, and the resin content of the insulating layer was about 79%.

Copper-Containing Laminate 5

Figure 3:
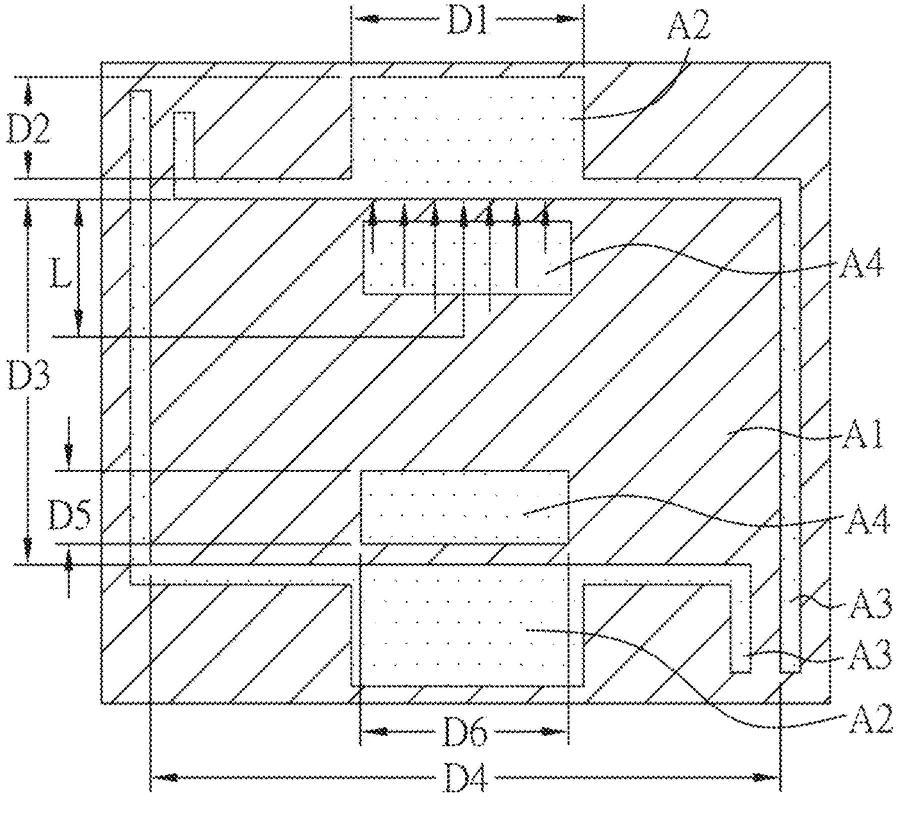
FIG. 3 is a top view of a circuit-containing laminate 5.

Two reverse treatment foils (RTF) with the thickness of 18 μm, one copper-containing laminate 4 and two prepregs 2 (each Embodiments or each Comparative embodiments) were provided, wherein each prepreg 2 has the length of 30 cm and the width of 21 cm. The copper foils at two sides of the copper-containing laminate 4 were used to prepare the circuit regions including copper-containing regions and copper-free regions, and the circuit regions were formed by the conventional lithography process. The copper foils of the copper-containing regions of the copper-containing laminate 4 were subjected to the known brown oxide treatment to obtain the brown oxide treated board. The brown oxide treated board at least comprises: a large copper region A1 treated with the brown oxide treatment and having the length D4 of 6 cm and the width D3 of 4.5 cm (as shown in FIG. 3); at least two open areas A2 without copper adjacent to the large copper region A1 (as shown in FIG. 3), wherein each open area A2 has the length D1 of 2 cm and the width D2 of 1.5 cm; and at least two open areas A4 without copper inside the large copper region A1 (as shown in FIG. 3), wherein each open area A4 has the length D6 of 1.5 cm and the width D5 of 0.5 cm, and the distance of the parallel gap between the open area A2 and the open area A4 is 0.1 cm (as shown in FIG. 3). One reverse treatment foil (RTF), one prepreg 2, one brown oxide treated board, one prepreg 2 and one reverse treatment foil (RTF) were laminated in sequence, and the lamination was performed under a vacuum condition at 400 psi and 215° C. for 4 hours to obtain a copper-containing laminate 5.

Copper-Free Laminate 1

The aforesaid copper-containing laminate 1 was etched to remove the outmost copper foils on both sides to obtain a copper-free laminate 1.

Circuit-Containing Laminate 5

The aforesaid copper-containing laminate 5 was etched to remove the outmost copper foils on both sides to obtain a circuit-containing laminate 5.

The test methods and characteristic analysis items for the aforementioned samples to be tested are explained as follows.

Adhesion Strength Between the Glass Fiber Fabric and the Resin of the Insulating Layer The adhesion strength between the glass fiber fabric and the cured resin of the insulating layer was measures as follows. The aforesaid copper-containing laminate 1 (formed by laminating eight prepregs 1, and the resin content is about 53%) was used and cut into a rectangular sample 1 with the width of 12.7 mm and the length of 70 mm. A universal tensile strength testing machine and the method described in IPC-TM-650 2.4.8 were used for measurement. The copper foil on the surface of the aforesaid rectangular sample 1 does not have to be etched. The test position of the adhesion strength between the glass fiber fabric and the cured resin of the insulating layer of the aforesaid rectangular sample 1 is the bonding interface between the glass fiber fabric of the outermost layer (that is, the outermost layer on any side) and the insulating layer formed by the cured resin adjacent to the glass fiber fabric. The tester used a knife to cut the aforesaid bonding interface, and then conducted subsequent measurements. A universal tensile strength testing machine was used to test the force required for the separation of the aforesaid glass fiber fabric and the aforesaid insulating layer formed by the cured resin at room temperature (about 25° C.), and the unit is lb/inch.

In the field of the present invention, the higher the adhesion strength between the glass fiber fabric and the cured resin of the insulating layer, the better. When the above adhesion strength is greater than or equal to 0.1 lb/inch, it means that there are significant differences in the adhesion strength between different samples (there is significant technical difficulty). For example, for the articles made by the resin composition of the present invention, the adhesion strength measured with reference to the method described in IPC-TM-650 2.4.8 is greater than or equal to 3.5 lbs/inch, for example, between 3.5 lbs/inch and 4.0 lbs/inch, and further for example between 3.6 lbs/inch and 3.9 lbs/inch.

Flame Retardancy Test

In the flame retardancy test, the aforesaid copper-free laminate 1 (formed by laminating eight prepregs 1, and the resin content is about 53%) was used and cut into a rectangular sample 2 (125±5 mm×13±0.5 mm). Five aforesaid rectangular samples 2 were prepared in each Embodiment and each Comparative embodiment, respectively. The measurement was conducted with reference to the method described in the UL94 vertical burning test specification (released by Underwriters Laboratories). Each rectangular sample 2 was placed in an environment with a temperature of 23±2° C. and a relative humidity of 50±5% for 48 hours, then each rectangular sample 2 was burned with a Bunsen burner, and the burning time of the sample after removing the Bunsen burner until its flame extinguished was recorded. That is, the total burning time is t1 plus t2, where t1 is the burning time of the sample after removing the Bunsen burner until its flame extinguished, and t2 is the second burning time of the sample after removing the Bunsen burner again until its flame extinguished. The unit is second. The burning time of each rectangular sample (i.e. the total burning time of t1 plus t2) in each Embodiment or Comparative embodiment was recorded. For example, in the flame retardant test measured with reference to the method described in the UL94 specification, for articles made of the resin composition of the present invention, the burning time of each sample in the same Embodiment is less than or equal to 10 seconds, and the total burning time of the five samples in the same Embodiment is less than or equal to 50 seconds. In addition, during the burning time test of each rectangular sample 2 of Embodiments 1 to 9 (E1 to E9) in the aforementioned Table 1 and Table 3, the particles dropped by each sample during the test did not ignite the cotton placed under the sample, and the flame or ember of each sample during the burning test did not burn to the upper fixture.

Conductive Anodic Filament (CAF) Test

In the conductive anode filament test, the circuit board test sample was made with reference to the method described in the IPC-TM-650 2.6.25 specification. The aforesaid copper-containing laminate 3 (eight-layered circuit board, where eight layers represent the total number of layers of copper foils) was used to prepare a circuit board as a test sample by the conventional process for preparing the printed circuit board. The circuit design of the circuit board refers to the IPC-9253 and in-line hole to hole design in the aforesaid specifications. The circuit had the spacing of 0.2 mm and 50 through holes were formed, and the interval between the inner walls the through holes is 0.3 mm, and the inner diameter of the through hole is 0.3 mm. The manufacturing methods of other circuit boards are common knowledge in the field of circuit boards, and are not repeated here. Each circuit board test sample of each Embodiments and Comparative Embodiments was placed in a 120° C. oven and baked for 6 hours. The circuit board test sample was placed into the 260° C. reflow machine for six times. The circuit board test sample was taken out and weld to the circuit of the resistance monitoring system according to the positive and negative. The circuit board test sample was placed into the constant temperature and humidity box (temperature 85° C. and relative humidity 85%) for 96 hours. Then, in the constant temperature and humidity box (temperature 85° C. and relative humidity 85%), the test voltage of the circuit board test sample was set to 100 volts (V), and a high resistance meter was used to measure the resistance change of the circuit board test sample with the increase of time. When the resistance of the circuit board test sample is less than $10^7\Omega$, it means that the test sample has failed, and the failure time is recorded (unit is every 10 hours). For example, if 470 hours is recorded in the CAF test, it means that the failure time of the test sample in the CAF test is 470±5 hours. For example, if >1500 hours is recorded in the CAF test, it means that the test sample has not failed after more than 1500 hours, and the test will be stopped after more than 1500 hours without failure, which means that the test sample will not fail after more than 1500 hours in the CAF test. For example, the test sample will not fail after more than 1500 hours and less than 1600 hours, or more than 1500 hours and less than 1550 hours in the CAF test, but the present invention is not limited thereto.

Bonding Gap Test

Figure 2:
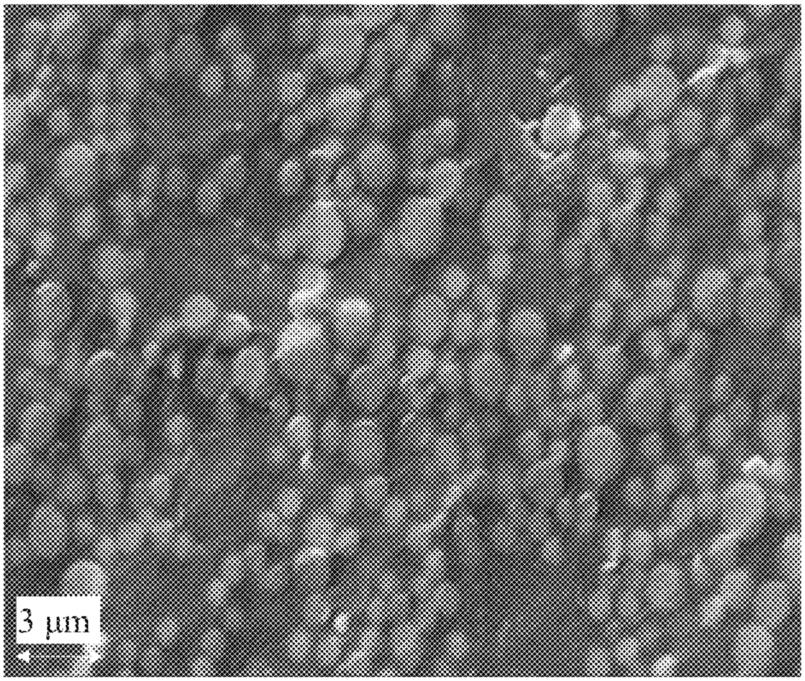
FIG. 2 is a SEM image showing a bonding gap test that passed.

In the bonding gap test (also called as the bonding gap test between the insoluble flame retardant and the resin), the aforesaid copper-containing laminate 3 was used. Each section test sample was prepared by the conventional vertical section method for the circuit board, and the section method (for example, sampling, sealing, grinding, polishing, etc.) are the common knowledge in the field of circuit boards, and are not repeated here. Each section test sample was observed through the scanning electron microscope (SEM) to see if there is a bonding gap between the insoluble flame retardant and the resin on the section of the section test sample. For example, the tester observed whether there is a crack gap greater than or equal to three microns in the section test sample by SEM. If there is at least one crack gap greater than or equal to 3 microns in the section test sample, it means “test not passed” and recorded as failed. If there is no crack gap greater than or equal to 3 microns in the section test sample, it means "test passed" and recorded as passed. For example, FIG. 1 is a SEM image showing a bonding gap test that failed, wherein mark ① indicates the insoluble flame retardant, mark ② indicates the crack gap, and mark ③ indicates the inorganic filler (such as spherical silica). FIG. 2 is a SEM image showing a bonding gap test that passed, wherein there is no crack gap greater than or equal to 3 microns.

Glue Flow Mark Grade Test of the Prepreg

Please refer to FIG. 3. In the glue flow mark grad test of the prepreg, the aforesaid circuit-containing laminate 5 was used. The tester used an optical microscope to observe whether the insulating layer on the large copper region A1 (including the open area A4 and/or the open area A2) of the circuit-containing laminate 5 has glue flow marks (as indicated by the arrow, the glue flow mark is the flow mark with abnormal appearance and color caused by the uneven flow when the resin flows). When there are glue flow marks on the large copper region A1 (including the open area A4 and/or open area A2) of the circuit-containing laminate 5, the farthest distance of the glue flow mark is measured. For example, the farthest distance of the flow mark adjacent to open area A2 is measured, and it is defined as the length L of the flow mark. Herein, the length L of the flow mark less than 2 mm (millimeter) is grade 1, the length L of the flow mark greater than or equal to 2 mm and less than 5 mm is grade 2, the length L of the flow mark greater than or equal to 5 mm and less than 10 mm is grade 3, the length L of the flow mark greater than or equal to 10 mm is grade 4, the length L of the flow mark covering the entire large copper region A1 is grade 5. If there is no glue flow mark on the large copper region A1 (including the open area A4 and/or the open area A2), the grade is 0. The grade 0 to grade 2 of the glue flow marks is within the acceptable range, the grade 3 to grade 5 of the glue flow marks is in the unacceptable range, and the circuit-containing laminates with the grade 3 to grade 5 of the glue flow marks has to be discarded. In FIG. 3, the circuit-containing laminate 5 further comprises glue overflow port A3, which is the conventional technology for the printed circuit boards. When the copper-containing laminate 5 is laminated, the resin composition of the prepreg 2 will flow from the large copper region A1 to the open area A2 and the open area A4 without copper. If the flow of the resin composition is uniform during filling, no glue flow mark is occurred. If the flow of the resin composition is uneven during filling, glue flow marks will occur. When the scanning electron microscope is used to observe the glue flow mark area of the section sample, it can be found that the inorganic filler and the insoluble flame retardant in the insulating layer are not evenly distributed in the glue flow mark area. On the contrary, it can be found that the inorganic filler and the insoluble flame retardant in the insulating layer are uniformly distributed (uniformly dispersed) in the section sample of the area without the glue flow mark.

The above test results are shown in Table 4 to Table 6 below.

TABLE 4

The test results of the samples prepared by the resin compositions of Embodiments 1 to 5

| Characteristics | Unit | E1 | E2 | E3 | E4 | E5 |
|---|---|---|---|---|---|---|
| Adhesion strength between the glass fiber fabric and the resin of the insulating layer | lb/inch | 3.9 | 3.6 | 3.7 | 3.6 | 3.6 |
| Bonding gap test between the insoluble flame retardant and the resin | | Passed | Passed | Passed | Passed | Passed |
| Glue flow mark grade test of the prepreg | | 0 | 2 | 1 | 0 | 1 |
| Flame retardancy test | Second | 7, 6, 8, 7, 8 | 8, 9, 8, 8, 8 | 7, 7, 8, 8, 7 | 8, 7, 8, 6, 8 | 7, 6, 6, 5, 7 |
| Conductive anodic filament test | Hour | >1500 | >1500 | >1500 | 1310 | 1230 |

TABLE 5

The test results of the samples prepared by the resin compositions of Comparative embodiments 1 to 8

| Characteristics | Unit | C1 | C2 | C3 | C4 | C5 | C6 | C7 | C8 |
|---|---|---|---|---|---|---|---|---|---|
| Adhesion strength between the glass fiber fabric and the resin of the insulating layer | lb/inch | 3.3 | 3.2 | 3.3 | 3.1 | 3.1 | 3.2 | 3.4 | 3.2 |
| Bonding gap test between the insoluble flame retardant and the resin | | Failed | Failed | Failed | Failed | Failed | Failed | Failed | Failed |
| Glue flow mark grade test of the prepreg | | 3 | 4 | 3 | 4 | 5 | 4 | 4 | 3 |

TABLE 5-continued

The test results of the samples prepared by the resin compositions of Comparative embodiments 1 to 8

| Characteristics | Unit | C1 | C2 | C3 | C4 | C5 | C6 | C7 | C8 |
|---|---|---|---|---|---|---|---|---|---|
| Flame retardancy test | Second | 11, 9, 8, 12, 8 | 8, 11, 8, 12, 8 | 9, 11, 13, 9, 8 | 12, 8, 12, 8, 9 | 11, 8, 10, 8, 9 | 12, 8, 9, 10, 8 | 11, 12, 9, 9, 8 | 10, 8, 9, 12, 8 |
| Conductive anodic filament test | Hour | 690 | 470 | 760 | 550 | 610 | 530 | 520 | 740 |

TABLE 6

The test results of the samples prepared by the resin compositions of Embodiments 6 to 9

| Characteristics | Unit | E6 | E7 | E8 | E9 |
|---|---|---|---|---|---|
| Adhesion strength between the glass fiber fabric and the resin of the insulating layer | lb/inch | 3.8 | 3.7 | 3.6 | 3.6 |
| Bonding gap test between the insoluble flame retardant and the resin | | Passed | Passed | Passed | Passed |
| Glue flow mark grade test of the prepreg | | 1 | 1 | 1 | 1 |
| Flame retardancy test | Second | 3, 4, 4, 5, 4 | 7, 6, 8, 7, 8 | 4, 3, 5, 4, 4 | 7, 7, 8, 7, 8 |
| Conductive anodic filament test | Hour | 1310 | >1500 | 1290 | >1500 |

In Embodiment 1 (E1), when the resin composition of the present invention comprises the compound having the structure of formula (1), the adhesion strength between the glass fiber fabric and the insulating layer resin of the copper-containing laminate prepared by the resin composition of Embodiment 1 (E1) is greater than 3.5 lb/inch, the burning time of each sample of the copper-free laminate prepared by the resin composition of Embodiment 1 (E1) measured according to the UL94 vertical burning test specification is less than or equal to 10 seconds (five samples were tested). On the contrary, for the resin composition of Comparative embodiment 3 (C3) without the compound having the structure of formula (1) and the resin composition of Comparative embodiment 1 (C1) with other kinds of phosphate (PX-200), the adhesion strength between the glass fiber fabric and the resin of the insulating layer of the copper-containing laminate prepared by the resin compositions of Comparative embodiments 1 and 3 (C1 and C3) greater than 3.5 lb/inch and the burning time of each sample of the copper-free laminate prepared by the resin compositions of Comparative embodiments 1 and 3 (C1 and C3) less than or equal to 10 seconds (five samples were tested) cannot be achieved at the same time.

For the resin composition of Comparative embodiment 2 (C2) with other kinds of phosphate (PX-200) having the content of 10 parts by weight, the resin composition of Comparative embodiment 4 (C4) with conventional siloxane compound as the dispersant, and the resin compositions of Comparative embodiments 5 to 8 (C5 to C8) with other kinds of phosphate and siloxane compound as the dispersant, the adhesion strength between the glass fiber fabric and the resin of the insulating layer of the copper-containing laminate prepared by the resin compositions of Comparative embodiments 2, 4 to 8 (C2, C4 to C8) greater than 3.5 lb/inch and the burning time of each sample of the copper-free laminate prepared by the resin compositions of Comparative embodiments 2, 4 to 8 (C2, C4 to C8) less than or equal to 10 seconds (five samples were tested) cannot be achieved at the same time.

When the resin compositions of Embodiments 1 to 9 (E1 to E9) were used to prepare circuit boards as test samples, the circuit boards tested by the CAF test referring to the method described in IPC-TM-650 2.6.25 can pass the test time of more than 1,000 hours. On the contrary, the circuit board prepared by the resin compositions of Comparative embodiments 1 to 8 (C1 to C8) without the compound of formula (1) cannot pass the test time of more than 1,000 hours in the CAF test.

In addition, the results of the bonding gap test indicate that no significant crack gaps were observed in the samples prepared by the resin compositions with the compound of formula (1) (Embodiments 1 to 9 (E1 to E9)). On the contrary, crack gaps were observed in the samples prepared by the resin compositions without the compound of formula (1) (Comparative embodiments 1 to 8 (C1 to C8)). These results indicate that, the problem of cracks in the insulating layer when the insoluble flame retardant is used can be effectively improved by adding an appropriate amount of the compound of formula (1) to the resin composition.

The invention claimed is:

1. A resin composition, comprising:

75 parts by weight of vinyl group-containing polyphenylene ether resin;

35 parts by weight to 60 parts by weight of an insoluble flame retardant; and 0.4 parts by weight to 5 parts by weight of a compound represented by the following formula (1):

(1)

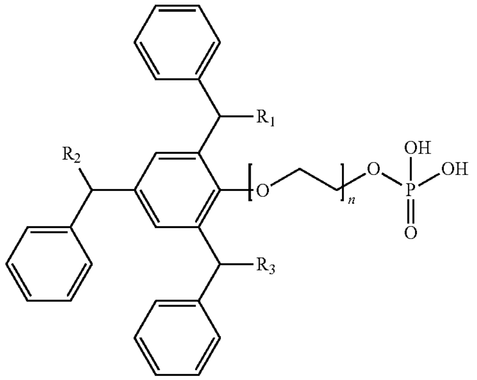

wherein each $R_1$, $R_2$ and $R_3$ is independently $C_{1-6}$ alkyl, and n is a positive integer from 4 to 25.

2. The resin composition of claim 1, wherein $R_1$, $R_2$ and $R_3$ are the same.

3. The resin composition of claim 1, wherein $R_1$, $R_2$ and $R_3$ are methyl.

4. The resin composition of claim 1, wherein the vinyl group-containing polyphenylene ether resin comprises: methacrylate-containing polyphenylene ether resin, vinylbenzyl group-containing biphenyl polyphenylene ether resin or a combination thereof.

5. The resin composition of claim 1, wherein the insoluble flame retardant comprises: insoluble phosphorus-containing flame retardant, insoluble brominated flame retardant or a combination thereof.

6. The resin composition of claim 1, wherein the insoluble flame retardant comprises: insoluble flame retardant containing 9,10-dihydro-9-oxa-10-phosphaphenanthrene-10-oxide (DOPO), insoluble flame retardant containing diphenylphosphine oxide (DPPO) or a combination thereof.

7. The resin composition of claim 1, wherein the insoluble flame retardant comprises: di-DOPO flame retardant, di-DPPO flame retardant or a combination thereof.

8. The resin composition of claim 1, wherein the insoluble flame retardant comprises: insoluble phosphorus-containing flame retardant having a structure represented by the following formula (2), insoluble phosphorus-containing flame retardant having a structure represented by the following formula (3) or a combination thereof:

(2)

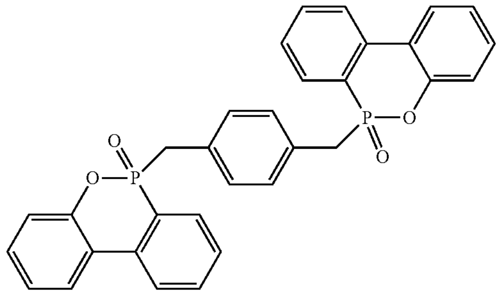

-continued (3)

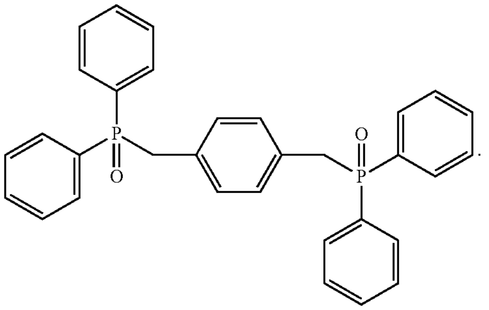

9. The resin composition of claim 1, wherein the insoluble flame retardant comprises: decabrominated flame retardant, octabrominated flame retardant or a combination thereof.

10. The resin composition of claim 1, wherein the insoluble flame retardant comprises: insoluble brominated flame retardant having a structure represented by the following formula (4), insoluble brominated flame retardant having a structure represented by the following formula (5) or a combination thereof:

(4)

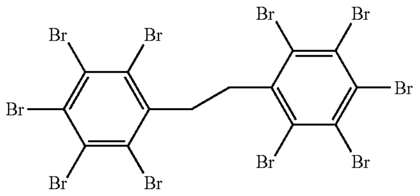

(5)

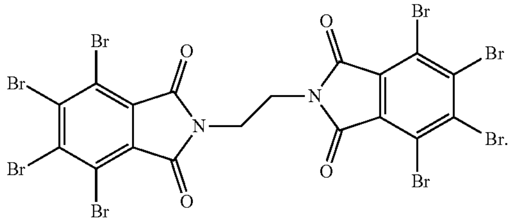

11. An article manufactured from the resin composition of claim 1, wherein the article includes a prepreg, a resin film, a laminate plate or a printed circuit board.

* * * * *